(12) United States Patent
Mizutani

(10) Patent No.: US 8,210,620 B2
(45) Date of Patent: Jul. 3, 2012

(54) BRAKING FORCE CONTROL SYSTEM FOR VEHICLES

(75) Inventor: Yasuji Mizutani, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1176 days.

(21) Appl. No.: 11/547,483

(22) PCT Filed: Jun. 29, 2005

(86) PCT No.: PCT/JP2005/012432
§ 371 (c)(1),
(2), (4) Date: Oct. 2, 2006

(87) PCT Pub. No.: WO2006/006453
PCT Pub. Date: Jan. 19, 2006

(65) Prior Publication Data
US 2008/0007115 A1    Jan. 10, 2008

(30) Foreign Application Priority Data
Jul. 8, 2004   (JP) .................................. 2004-201570

(51) Int. Cl.
*B60T 8/34* (2006.01)
(52) U.S. Cl. ...... 303/146; 303/175; 303/186; 303/113.5
(58) Field of Classification Search .................. 303/146, 303/175, 186, 113.5, 114.1
See application file for complete search history.

(56) References Cited

U.S. PATENT DOCUMENTS

| 6,293,633 | B1 | 9/2001 | Hara et al. | |
| 6,729,697 | B2 | 5/2004 | Yasui et al. | |
| 2001/0038240 | A1 | 11/2001 | Yoshida et al. | |
| 2002/0005662 | A1* | 1/2002 | Yasui et al. | 303/150 |

FOREIGN PATENT DOCUMENTS

| DE | 101 16 801 A1 | 3/2003 |
| DE | 697 18 005 T2 | 11/2003 |
| DE | 697 21 545 T2 | 3/2004 |
| EP | 0 918 004 B1 | 12/2002 |
| EP | 0 919 444 B1 | 5/2003 |
| JP | A 9-290746 | 11/1997 |
| JP | A 10-59149 | 3/1998 |
| JP | A 10-95327 | 4/1998 |
| JP | A-11-189139 | 7/1999 |
| JP | A 11-263203 | 9/1999 |
| JP | A-2001-151094 | 6/2001 |
| WO | WO 02/14130 A1 | 2/2002 |

* cited by examiner

*Primary Examiner* — Bradley King
(74) *Attorney, Agent, or Firm* — Oliff & Berridge, PLC

(57) ABSTRACT

According to the braking force control system of the present invention it is prevented that the braking root pressure is increased unnecessarily high when the braking force increase suppressing control was initiated during the execution of the brake assist control without losing the effects of increasing the braking force available when the brake assist control only is executed. When the brake assist control is initiated, the pressure increase Pcf, Pcr of the braking root pressure of the front and rear wheels is increased relative to the master cylinder pressure Pm, but when the anti-skid control is executed for the left and right of the front or rear wheels, when the anti-skid control is executed for one of the front left and right wheels, while a yaw behavior control is executed for the other of the front left and right wheels, or when a braking force front/rear distribution control is executed, during the execution of the anti-skid control, the increase of the braking root pressure for the front or rear wheels is suppressed.

4 Claims, 10 Drawing Sheets

(A)

(B)

*BRAKING ROOT PRESSURE SUPPRESSED

BRAKING FORCE CONTROL SYSTEM FOR VEHICLES

FIELD OF THE INVENTION

The present invention relates to a braking force control system for vehicles, and more particularly, to an electronic braking force control system for vehicles.

BACKGROUND OF THE INVENTION

It is known to execute a brake assist control so as to generate a higher braking force than usual by a normal braking action when the driver depresses the brake pedal quickly when a vehicle such as an automobile is running. In a vehicle equipped with a common fluid (oil) hydraulic brake system, the brake assist control is executed such that the master cylinder pressure varying according to the depression of the brake pedal by the driver is increased by a pump before being supplied to the wheel cylinders of the respective wheels, or an oil pressure generated by a pump separately from the master cylinder is supplied to the wheel cylinders of the respective wheels, so that thereby a strong braking force is generated corresponding to an increased oil pressure in the wheel cylinders. The quick braking action is detected by, for example, the depressing speed of the brake pedal. According to such a brake assist control, it is possible, even when the depressing force by the driver is insufficient, to generate a strong braking force for swiftly decelerating or stopping the vehicle.

During the execution of such a brake assist control, since the braking forces of the respective wheels increase quickly, the wheels are liable to locking. When the slip ratio of any wheel becomes excessive by the execution of the brake assist control, an anti-skid control (ABS) is executed so as to suppress the braking force from becoming excessive, as described in, for example, Japanese Patent Laid-open Publications Hei 9-290746 and Hei 10-59149 based upon the applications filed by the same applicant as the present application. (In Japanese Patent Laid-open Publication Hei 9-290746, there is described a brake assist control in a case that a vehicle performance modification device such as the anti-skid control does not normally operate. According to this publication, in consideration that the rear wheels are liable to locking prior to the front wheels, the gradient of the braking pressure increase of the rear wheels by the brake assist control is decreased so as to prevent that the side force of the rear wheels lowers rapidly.)

Further, when the wheels become liable to locking due to an increase of the braking force by the brake assist control, there sometimes occurs that other control such as the vehicle behavior stability control (VSC) or the braking force front/rear distribution control (EBD) do not effectively operate. In view of this, in the above-mentioned Japanese Patent Laid-open Publication Hei 10-59149, for example, it is proposed that, when an oversteer tendency is to be suppressed, the brake assist control of the rear wheels is prohibited or the increase of the braking force by the brake assist control is suppressed, so as to prevent a too much lowering of the cornering force of the rear wheels due to an increase of the braking force by the brake assist control.

As briefly described above, when the brake assist control is executed in the oil-hydraulic brake system, the braking root pressure (the pressure in a common passage for conducting the oil pressure before being branched toward the respective wheel cylinders) is increased by a pump, so that the increased braking root pressure is supplied to the respective wheel cylinders to increase the braking pressures therein. When the anti-skid control is executed with respect to a certain wheel in such a condition, a valve provided for the wheel cylinder of a particular wheel is operated to restrict the flow of the brake oil to the wheel cylinder. In other words, when a braking force increase suppression control such as the anti-skid control is executed to suppress the increase of the braking force during the execution of a braking force increasing control such as the brake assist control, there occurs a control which is inefficient in the energy consumption such that the braking root pressure is increased in the brake system on one hand, while the pressure is suppressed in the same brake system on the other hand. The same situation occurs when the vehicle behavior stability control to selectively increase or decrease the braking pressure or the braking force front/rear distribution control is executed during an execution of the brake assist control.

Nevertheless, the energy loss in such a parallel execution of the braking force increasing control and the braking force suppressing control in the same brake system was scarcely considered in the conventional braking force control.

DISCLOSURE OF THE INVENTION

According to the present invention, there is provided such a braking force control system for a fluid or oil hydraulic brake system of a vehicle in which, when a braking force increasing control for increasing the braking force as compared with that corresponding to the braking operation by the driver when the driver makes a quick braking operation and a braking force increase suppressing control for suppressing the increase of the braking force of a selected wheel or wheels when the vehicle is in a certain running condition are executed in parallel, the braking force is controlled to satisfy the demand for increase of the braking pressure or the braking root pressure by the braking force increasing control and the demand for suppression of increase of the braking pressure by the braking force increase suppressing control, in a manner to improve the energy efficiency of the control, while not damaging the effects of the both controls.

The braking force control system according to the present intention has control valves for controlling the braking pressures of the respective wheels corresponding to the braking devices or the braking force generating devices provided for the respective wheels of a vehicle. The control valves of the respective wheels receive a braking root pressure adjusted to increase or decrease by the braking root pressure control means and individually adjust the braking pressures of the respective wheels, so that thereby the braking forces generated at the respective wheels are individually controllable. The braking root pressure control means may be constructed by, for example, a hydraulic pump, pressure control valves, etc. The braking force control system comprises a judging means for judging an initiation or a high probability thereof of a braking force increase suppressing control, and a braking root pressure increase suppressing means for suppressing the increase of the braking root pressure when it is judged by said judging means during a braking force increasing control that the braking force increase suppressing control was initiated or the probability thereof is high as compared to when it is not judged by the judging means that the braking force increase suppressing control is initiated or the probability thereof is high. In other words, according to the construction of the present invention, when there occurred a demand for an increase of the braking root pressure by a braking force increasing control such as the brake assist control or the front wheel braking force control by the braking force front/rear distribution control and a demand for a suppress of increase of the braking pressure for suppressing the increase of the braking force or the braking pressure in a selected wheel or wheels by a braking force increase suppressing control such as the anti-skid control or the rear wheel braking force suppress control by the braking force front/rear distribution control simultaneously in one brake system, the braking root pressure upstream of the control valves of the respective wheels, i.e. the pressure of the braking pressure source, is lowered as compared to the case of mere execution of the braking force increasing control.

In the conventional braking force control, when the braking force increasing control is executed, the braking root pressure upstream of the control valve of the wheel at which the braking force increase suppressing control is executed is also increased in the same manner as in the case that the braking force increase suppressing control is not executed, and therefore, an energy for increasing the braking root pressure is consumed in spite of the suppression of increase of the braking pressure. In contrast, according to the system of the present invention, when the braking force increasing control and the braking force increase suppressing control are simultaneously executed, the increase of the braking root pressure upstream of the control valves is suppressed by the braking root pressure increase suppressing means, so that thereby the energy for increasing the braking root pressure is saved. Further, according to the present invention, since the pressure difference between the braking root pressure upstream of the control valve and the braking pressure downstream of the control valve of the wheel at which the braking pressure increase suppressing control is executed is decreased by the suppression of the braking root pressure, the control of the braking pressure by the control valve becomes more accurate as compared with the conventional case. (A larger pressure difference across the control valve is apt to cause an excessive braking pressure.)

In this connection, it should be noted that the suppression of the increase of the braking root pressure by the braking root pressure increase suppressing control according to the present invention is not only to prohibit the increase of the braking root pressure but also to increase the braking root pressure to a lower degree than in the usual case that there is no judgment of the initiation of the braking force increase suppressing control or a high probability thereof. In the actual braking force control, there occurs a case that the braking force increase suppressing control once initiated is dissolved in the way of the breaking force increase. In such a case, it is desirable that the braking pressure of the wheel at which the braking force increase suppressing control was dissolved is quickly increased to the braking pressure required by the braking force increasing control. However, if the increase of the braking root pressure in the upstream of the control valve of the wheel at which the braking force increase suppressing control is executed is completely prohibited in the way of the braking force increase, the braking root pressure is maintained substantially at the pressure at the time of the judgment of the initiation of the braking force increase suppressing control, so that the increase of the braking pressure of the wheel after the dissolving of the braking force increase suppressing control would be delayed. In view of this, the braking force increase suppressing control according to the present invention is desirably so executed that, when the braking force increase suppressing control is executed for a certain wheel, after the above-mentioned judgment, the braking root pressure is allowed to increase to a pressure higher than the braking pressure required by the braking force increase suppressing control but lower than the braking root pressure required by the braking force increasing control. By such an arrangement, when the braking force increase suppressing control executed for a certain wheel is dissolved, the wheel cylinder of that wheel is given a relatively increased braking root pressure, so that the braking pressure of that wheel is swiftly increased.

In an embodiment of the braking root pressure increase suppressing control according to the present invention, the control may be so carried out as to decrease the increasing gradient of the braking root pressure. In this case, therefore, the braking root pressure increase suppressing control is a control for decreasing the braking root pressure increase gradient. According to this embodiment, the braking root pressure increases even under the braking force increase suppressing control, but since the increasing gradient is smaller than in the absence of such control, the energy consumed for increasing the braking root pressure is saved, and further, since a relatively increased braking root pressure flows into the wheel cylinder of the wheel at which the braking force increase suppressing control was executed after the dissolving thereof, the braking pressure of the wheel is rapidly increased so that the time for attaining the pressure required by the braking force increasing control is shortened.

In another embodiment of the braking root pressure increase suppressing control according to the present invention, when the braking force increasing control is executed so as to increase the braking root pressure up to a determined final target pressure, the braking root pressure increase suppressing control may be executed so as to lower the final target pressure. In this case, therefore, the braking root pressure increase suppressing control is a control for lowering the target braking root pressure. In this embodiment, when an upper limit is set for the final target value of the braking root pressure, the upper limit is lowered when the initiation of the braking force increase suppressing control or a high portability thereof was judged, so that thereby the energy consumed for the braking root pressure is saved. Further, in the same manner as in the case of decreasing the increaing gradient of the braking root pressure, when the braking pressure increase suppressing control is dissolved in the way of executing the braking force increasing control, the time for increasing the braking pressure to the pressure required by the braking force increasing control is shortened by the braking root pressure having been increased to some extent.

The conditions for executing the braking root pressure increase suppressing control according to the present invention depend in detail on the passage construction of the oil-hydraulic brake system in which the braking force control system according to the present invention is incorporated. For example, when the brake system is a front-rear dual system in which a front system for the front left and front right wheels and a rear system for the rear left and rear right wheels are independent, respectively, and when an initiation or a high probability thereof of the anti-skid control was judged with respect to both of the left and right wheels of the front or rear wheels, the braking root pressure increase suppressing control may desirably be executed with respect to the braking root pressure for the front or rear wheels. Further, in such a type of brake system, when an initiation or a high probability thereof of the anti-skid control is judged with respect to one of the front left and front right wheels, while an initiation or a high probability thereof of the yaw behavior control for suppressing an increase of the braking force difference between the front left and the front right wheels is judged with respect to the other of the front left and front right wheels, i.e. when the braking force increase suppressing control is executed with respect to both of the front left and front right wheels, the braking root pressure increase suppressing control may also be executed. Further, when the brake system is the so-called X-pipe system in which the front left wheel and the rear right wheel construct an independent pair, while the front right wheel and the rear left wheel construct an independent pair, the braking force increase suppressing control may desirably be executed when the braking force increase suppressing control is executed with respect to the both wheels of each pair. In any of those systems, when the braking force increase suppressing control is not executed with respect to one or more of the wheel cylinders connected to one system, while the braking force increase control is executed, the braking root pressure increase suppressing control may not be executed.

Further, in the embodiments of the present invention, the judging means may judge that the braking force increase suppressing control was initiated when the conditions for initiating the braking force increase suppressing control were established so as to execute the braking root pressure increase suppressing control, but it may also execute the braking root pressure increase suppressing control when it judges a high probability of the initiation of the braking force increase suppressing control. The judgment for the probability of initiation of the braking force increase suppressing control being high or not may be done by estimating if the braking force of the wheel has become high or not. In more detail, a high probability of initiation of the braking force increase suppressing control may be judged by, for example, (i) if the total increase amount of the braking root pressure by the braking force increasing control is above a standard value or not (The braking force of the wheel is higher as the total increase amount of the braking root pressure by the braking force increasing control is larger), (ii) if the consecutive time of the braking root pressure increase by the braking force increasing control is larger than a standard time or not (The total increase amount of the braking root pressure by the braking force increasing control is a larger as the consecutive time of the braking root pressure increase is longer, and therefore, the braking force of the wheel is higher as the consecutive time of the braking root pressure increase is longer), or (iii) if the braking root pressure has reached a standard value or not.

Further, in the embodiments of the present invention, the increasing rate or the increasing gradient of the braking root pressure by the braking force increasing control may be decreased according to the lapse of time even when the braking root pressure increase suppressing control is not executed. When the braking force increasing control is executed in response to a quick braking operation, it is desirable that the braking force is increased as quickly as possible in the initial stage. However, the wheel is liable to locking after the braking force has increased to a certain level. Therefore, according to the present invention, after the braking force has increased to some extent, the increasing gradient of the braking root pressure may be decreased so that the braking root pressure is increased moderately, thereby avoiding a sudden start of locking of the wheel.

Further, in the embodiments of the present invention, when the braking root pressure is obtained by amplifying the master cylinder pressure, the braking root pressure may be controlled by controlling the pressure added to the maser cylinder pressure, but the braking root pressure may be increased or decreased by an algorithm of control. Further, it is to be noted that the present invention is also applicable to such a case that the braking root pressure is generated from a pump not depending upon the master cylinder pressure.

Thus, according to the present invention there is obtained a novel braking force control system for a hydraulic type brake system which executes a braking force increasing control for increasing the braking force in response to a quick braking operation by the driver and a braking force increase suppressing control executed for a selected wheel or wheels in parallel, at an improved energy efficiency, not to damage the effects of the both controls.

According to the present invention, there is obtained such a braking force control system as described above which, when the braking force increase suppressing control is executed during the execution of the braking force increasing control, controls the braking root pressure so that the adjustment of the braking pressure of the control valve corresponding to the wheel cylinder of the wheel at which the braking force increase suppressing control is executed can be controlled more easily at a higher precision.

According to the present invention, in such a braking force control system as described above, when the braking pressure increase suppressing control is executed during the execution of the braking force increasing control, the increase of the braking root pressure is suppressed to save the energy consumption.

According to the present invention, in such a braking force control system as described above, when the braking pressure increase suppressing control is executed during the execution of the braking force increasing control, the braking root pressure is controlled to such a pressure that is lower than the pressure to which the braking pressure is increased by the braking force increasing control when the braking force increase suppressing control is not executed but higher than the braking pressure of the wheel at which the braking pressure increase suppressing control is executed, so that the braking pressure is quickly increased by the braking force increasing control when the braking force increase suppressing control was dissolved.

Other objects and advantages of the present invention will become apparent from the following descriptions with respect to the preferred embodiments of the invention.

BRIEF DESCRIPTION OF THE DRAWINGS

In the accompanying drawings.

BEST MODE EMBODIMENTS OF THE INVENTION

Construction of the Brake System

Figure 1:
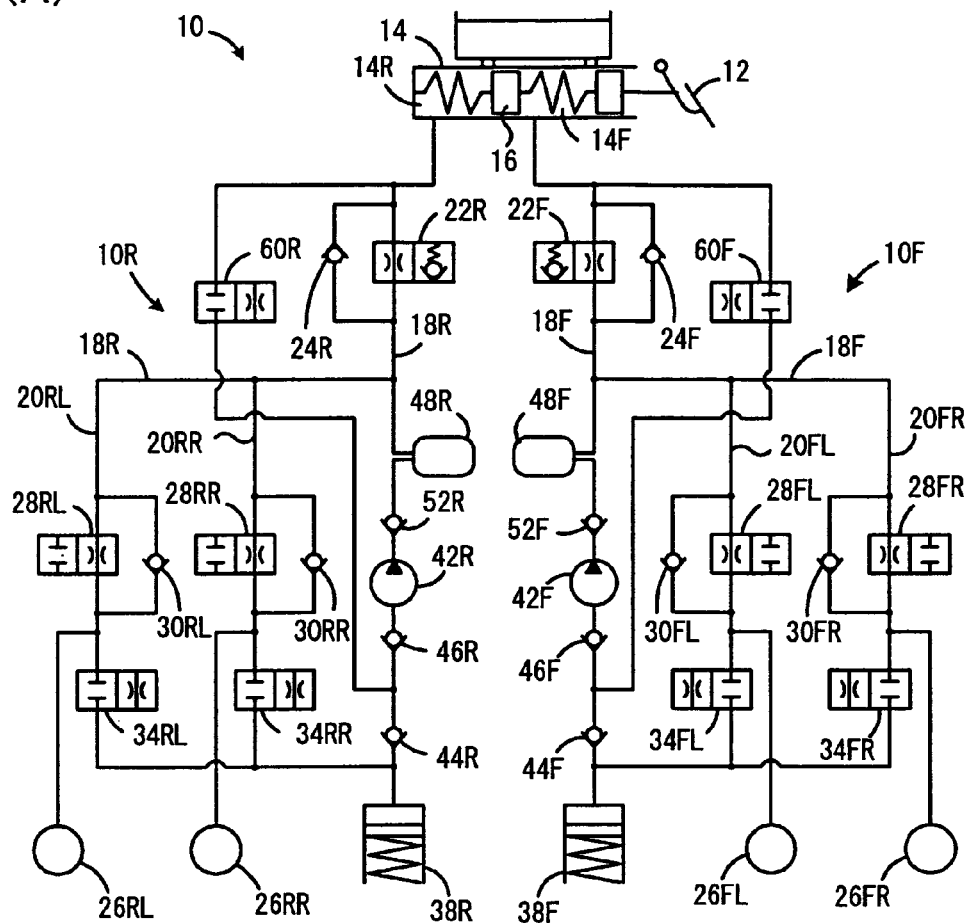
FIG. 1A is a diagrammatic view of the brake system in which an embodiment of the braking force control system accordance to the present invention is incorporated.
FIG. 1B is a diagrammatic view of an electronic control device for operating the hydraulic circuit of FIG. 1A.
Figure 1:
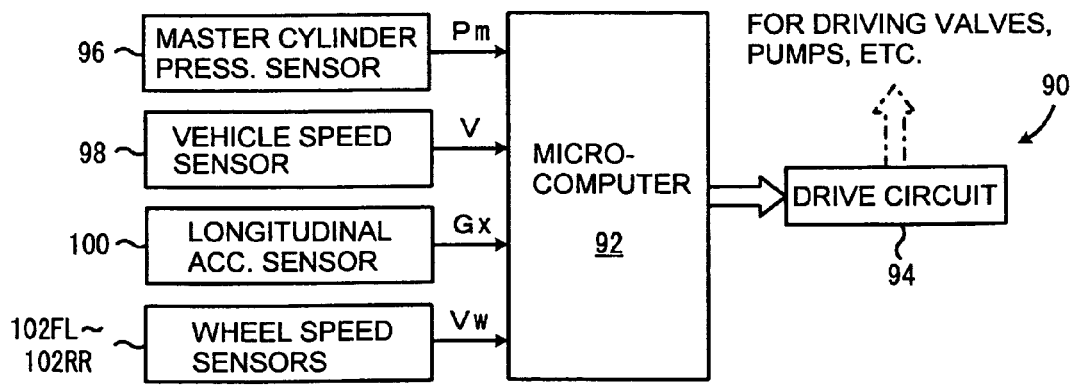

FIG. 1 is a diagrammatic view of the brake system in which an embodiment of the braking force control system for controlling the braking force of a vehicle according to the present invention is incorporated. The brake system comprises an oil-hydraulic circuit 10 (FIG. 1A) for transmitting the pressure of a master cylinder 14 (master cylinder pressure) to wheel cylinders 26i (i=FL, FR, RL, RR: front left wheel, front right wheel, rear left wheel and rear right wheel) of braking force generating devices provided at the respective wheels, and an electronic control device 90 (FIG. 1B) for controlling the flow of the brake fluid in the oil-hydraulic circuit by operating electromagnetic valves and other components thereof.

Referring to FIG. 1A, the oil-hydraulic circuit 10 herein shown is of a front/rear dual circuits type including a sub-circuit 10F for the wheel cylinders 26FL, 26FR of the front left and front right wheels and a sub-circuit 10R for the wheel cylinders 26RL, 26RR of the rear left and rear right wheels. Unless particularly specified, the two sub-circuits may be of the same construction. Of course, they may be of different constructions in the actual brake systems.

As in the normal brake systems, the master cylinder 14 has cylinder chambers 14F, 14R separated by a free piston 16 movably supported therein by a pair of springs, wherein the brake fluid in the cylinder chambers is pressurized by, for example, a brake pedal 12 being depressed by the driver. The chambers 14F, 14R are respectively connected with root passages 18F, 18R of the front and rear sub-circuits 10F, 10R, the root passages being respectively connected with respective branch passages 20i leading to the wheel cylinders 26i of the respective wheels. Two states normally open type electromagnetic valves 28i are provided in the branch passages 20i, and the brake fluid from the root passages 18F, 18R (i.e. from the master cylinder 14) is selectively supplied to the wheel cylinders 26i, whereby the wheel cylinders 26i are pressurized or maintained at certain pressures by the corresponding valves 28i being opened or closed. Further, in order to avoid that the wheel cylinders are excessively pressurized, non-return valves 30i are provided in parallel with the electromagnetic valves 28i in the root passages 18F, 18R which allow the brake fluid to flow only from the wheel cylinders 26i toward the root passages 18F, 18R. The branch passages 20i are connected with buffer reservoirs 38F, 38R provided in the sub-circuits 10F, 10R via two states normally closed type electromagnetic valves 34i, whereby the pressures of the respective wheel cylinders are selectively released by the corresponding valves 34i being opened. Therefore, in the respective branch passages 20i the electromagnetic valves 28i and 34i construct in combination such control valves that control the braking pressure of the corresponding wheel cylinders 26i.

The respective sub-circuits 10F, 10R further include normally open type pressure control valves 22F, 22R provided in the root passages 18F, 18R, motor-driven pumps 42F, 42R provided between the reservoirs 38F, 38R and the root passages 18F, 18R, and normally closed type electromagnetic valves 60F, 60R for fluidly connecting the master cylinder chambers 14F, 14R to the inlets of the corresponding pumps. These constructional elements are provided to adjust the pressures in the root passages, that is "braking root pressures", when the braking pressures of the respective wheel cylinders 26i are increased beyond the master cylinder pressure by the braking force increasing control like the brake assist control being executed. In order to prevent that the brake fluid flows in the not desired direction in the inlet side of the pumps, non-return valves 44F, 44R, 46F, 46R and 52F, 52R may be provided. Further, dampers 48F, 48R may be provided to equalize the output of the pumps.

When the braking root pressures in the root passages are adjusted to be higher than the master cylinder pressure, the pressure control valves 22F, 22R are closed, while the pressure control valves 60F, 60R are opened, whereby the master cylinder pressure is input to the pumps via the valves 60F, 60R. When the pumps 42F, 42R are operated in this condition, the brake fluid from the reservoirs 38F, 38R and the master cylinder is pressurized by the pumps 42F, 42R into the root passages 18F, 18R. As described in more detail hereinbelow, it is so constructed that the brake fluid flows from the root passages to the master cylinder only when the difference between the braking root pressures of the root passages 18F, 18R pressurized by the pumps and the master cylinder pressure exceeds a pressures determined by the control of the energizing electric current supplied to the solenoids of the pressure control valves 22F, 22R by the control device 90, whereby an increase of the difference between the braking root pressure and the master cylinder pressure is suppressed. Thus, the braking root pressures of the root passages 18F, 18R are controlled by the operation of the pressure control valves 22F, 22R to the pressure (exceeding the master cylinder pressure) instructed to the control device 90.

Figure 2:
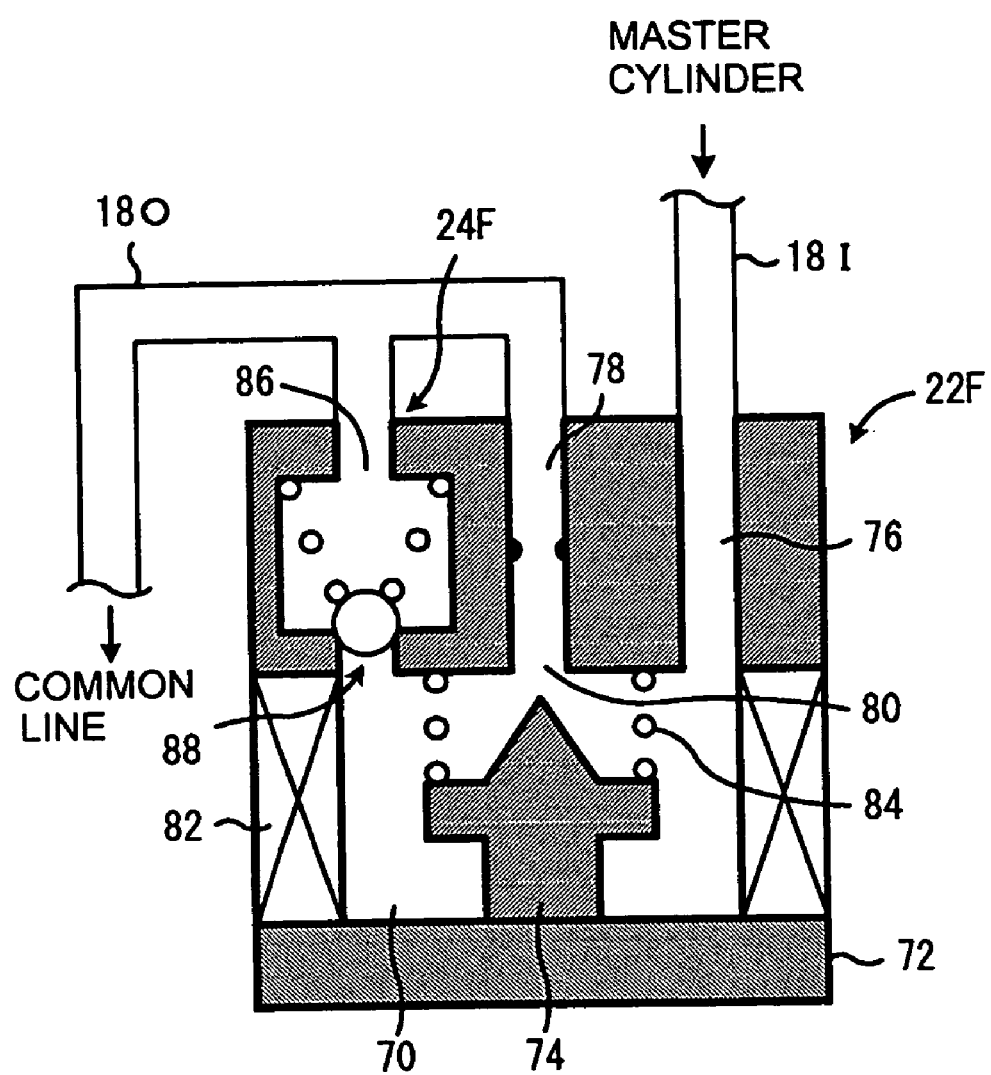
FIG. 2 is a diagrammatic sectional view showing the pressure control valve for the front wheels shown in FIG. 1A.

The pressure control valves 22F, 22R provided in the root passages 18F, 18R have such a construction as schematically shown in FIG. 2. As shown in the figure, the pressure control valve 22F(R) has a housing 72 having an input passage 18I connected with the master cylinder chamber 14F(R) and an output passage 18O communicating to the root passage 18F (R) leading to the wheel cylinders 26i, a valve chamber 70, a valve body 74 movable up and down in the valve chamber, and a solenoid 82. The inlet passage 18I and the outlet passage 18O are respectively opened to the valve chamber 70 via internal passages 76 and 78.

When the solenoid 82 is not energized, the valve body 74 is biased downward by a compression spring 84, whereby a port 80 of the internal passage 78 is opened to the outlet passage 18O so that the root passage 18F(R) is supplied with the master cylinder pressure. In contrast, when the solenoid 82 is energized, the valve body 74 moves upward against the force of the compression spring 84, whereby the port 80 is closed so that the communication between the master cylinder and the root passage is interrupted. However, since the root passage is pressurized by the pump 42F(R), when the sum of the spring force and the braking root pressure exceeds the sum of the master cylinder pressure and the electromagnetic force driving the valve body upward, the valve opens the port, whereby the brake fluid is allowed to flow from the root passage to the valve chamber 70. Therefore, the difference between the braking root pressure in the root passage 18F(R) pressurized by the pump and the master cylinder pressure is controlled by the electric current supplied to the solenoid 82 being controlled.

Further, in order to definitely control the braking root pressure, a non return valve 24F(R) is provided in parallel with the pressure control valve 22F(R) to have a valve ball biased by a spring to close a port 88 open to the valve chamber 70, so as to allow the brake fluid to flow only from the valve chamber toward the root passage, thereby maintaining the root pressure at or above the master cylinder pressure. (When the root pressure lowers below the master cylinder pressure, a flow of the brake fluid flows from the valve chamber 70 to the root passage 18O through the port 80, and therefore the pressure control becomes inoperative.) Although the non return valve 24F(R) shown in the embodiment is integrally incorporated in the pressure control valve 22F(R), it is to be understood that the non return valve may be constructed as a separate device.

The electronic control device 90 diagrammatically shown in FIG. 1B comprises a microcomputer 92 which may be of a common type having a central processing unit, a read only memory, a random access memory, input and output port means and a common bus (not shown) interconnecting these elements. The microcomputer 92 receives various signals such as a signal indicating the master cylinder pressure Pm from a master cylinder pressure sensor 96 provided near the master cylinder, a signal indicating vehicle speed V from a vehicle speed sensor 98, a signal indicating longitudinal acceleration Gx of the vehicle from a longitudinal acceleration sensor 100, and signals indicating wheel speeds Vwi from respective wheel speed sensors 102i, and determines whether or not to execute a brake assist control, an anti-skid control or a yaw behavior control as described hereinbelow according to the control flows stored in the microcomputer and the related data, and when the brake assist control is to be executed, operates the valves and the pumps by the drive means 94, so as to control the braking root pressures of the front root passage 18F and the rear root passage 18R. In the shown embodiment, the braking root pressures are controlled by controlling the electric currents for energizing the solenoids 82 of the pressure control valves 22F, 22R so that thereby the differences between the braking root pressures and the master cylinder pressure across the pressure control valves 22F, 22R are controlled as described above. Therefore, the electronic control device 90 determines the differences between the braking root pressures and the master cylinder pressure, i.e. target values Pcft (for front wheels) and Pcrt (for rear wheels) for pressure increases Pcf (for front wheels) and Pcr (for rear wheels) against the master cylinder pressure Pm.

In operation, in the normal condition (the condition that none of the braking force increasing control like the brake assist control and the braking force increase suppressing control like the anti-skid control is executed), the valves of the oil-hydraulic circuit 10 are in the condition shown in FIG. 1A. In such a condition, the master cylinder pressure is directly transmitted to the wheel cylinders 26i by the pressure control valves 22F, 22R and the electromagnetic control valves 28i being opened, whereby the braking pressures become substantially equal to the master cylinder pressure corresponding to the braking operation by the driver.

When the driver makes a quick braking operation such that the brake assist control is executed, the pressure control valves 22F, 22R are closed, while the valves 60F, 60R are opened, whereby the master cylinder pressure is introduced into the input side of the pumps 42F, 42R. And then the pumps 42F, 42R are driven so that thereby the braking pressures increased from the master cylinder pressure by the pumps are supplied to the root passages 18F, 18R. In this case, since the electromagnetic valves 28i are opened, the increased braking root pressures are supplied to the respective wheel cylinders so that the braking forces of the corresponding wheels are increased to higher braking forces than that corresponding to the master cylinder pressure.

When the brake assist control is executed so that thereby the braking forces of the respective wheels increase, the braking slip might become excessive at some of the wheels according to the conditions of the road surface. In such a case, in order to avoid that such a wheel or wheels get into a locked condition, the anti-skid control is executed for those wheels so that the increase of the braking force is suppressed so as thereby to restrict the slip ratio of the wheels within a determined range. Since the rear wheels are liable to get into a locked condition prior to the front wheels, when such conditions as described later are met, the braking force front/rear distribution control is executed to maintain or suppress the increase of the braking pressure of the rear wheels so as to avoid that the rear wheels get into a locked condition. Further, when there is a difference between the left and right sides in the frictional conditions of the road surface, or when the yaw behavior of the vehicle has deteriorated as a result of the execution of the anti-skid control for a one side wheel, a braking pressure suppressing control is executed to suppress the braking pressure of a selected wheel or wheels in such a manner as to generate a counter yaw moment (anti-spin or anti-driftout moment) for correcting the yawing behavior of the vehicle.

When the anti-skid control is executed for a wheel at which the braking slip has become excessive during the execution of the brake assist control, when the braking force of a certain selected. wheel is suppressed by executing the braking force front/rear distribution control to shift the braking force from the rear wheel to the front wheel, or when the braking force of a certain selected wheel is suppressed to generate a counter yaw moment in the brake system shown in FIG. 1, the electromagnetic valve 28i corresponding to the wheel at which the braking pressure is suppressed is closed, whereby the communication of the wheel cylinder of the corresponding wheel to the root passage is interrupted, whereby even when the braking root pressure increases further, the braking pressure of the corresponding wheel cylinder is maintained not to further increase. Further, in order to control the slip ratios of the wheels at appropriate values, the corresponding electromagnetic valves 28i and 34i are intermittently opened and closed so as to increase or decrease the braking pressures by alternating the communication of the corresponding wheel cylinders to between the braking root pressure and the low pressure buffer reservoir.

When there occurs such a condition in the brake system during the execution of the brake assist control that, for example, (a) the anti-skid control is executed for both of the front left and front right wheels, (b) the anti-skid control is executed for one of the front left and front right wheels, while in the other of the front left and front right wheels the increase of the braking force is suppressed for the yaw behavior control to suppress the increase of the difference in the braking force between the front left and front right wheels, (c) the anti-skid control is executed for both of the rear left and rear right wheels, or (d) the braking force front/rear distribution control is executed, the braking root pressures in the respective root passages are increased on one hand, while the braking pressure in one of the wheel cylinders is suppressed on the other hand.

Such a condition is not efficient from the view point of energy consumption, as the braking root pressure is uselessly increased. As already described, in the braking system of FIG. 1A, the braking root pressure of the root passage is increased by the pump during the braking force increasing control, while the braking pressures are adjusted by the brake fluid being released through the pressure control valves. While the motor for driving the pump is usually controlled to rotate at a constant speed, the torque or the load of the motor for driving the pump increases as the pressure difference between the outlet and the inlet of the pump increases so that the electric power consumption increases. In other words, the braking pressure suppressing control is executed in the wheel cylinders in priority to the brake assist control while consuming the electric power for increasing the braking root pressure by the brake assist control.

In view of the above, according to the present invention, when the braking force increase suppressing control is executed for all of the wheel cylinders connected to a root passage during the execution of the brake assist control, the increase of the braking root pressure of the root passage is suppressed, so that the energy consumption for increasing the braking root pressure is saved. In the following, the operation of the braking force control system according to the present invention will be described in detail.

Operation in the Brake Assist Control

Figure 3:
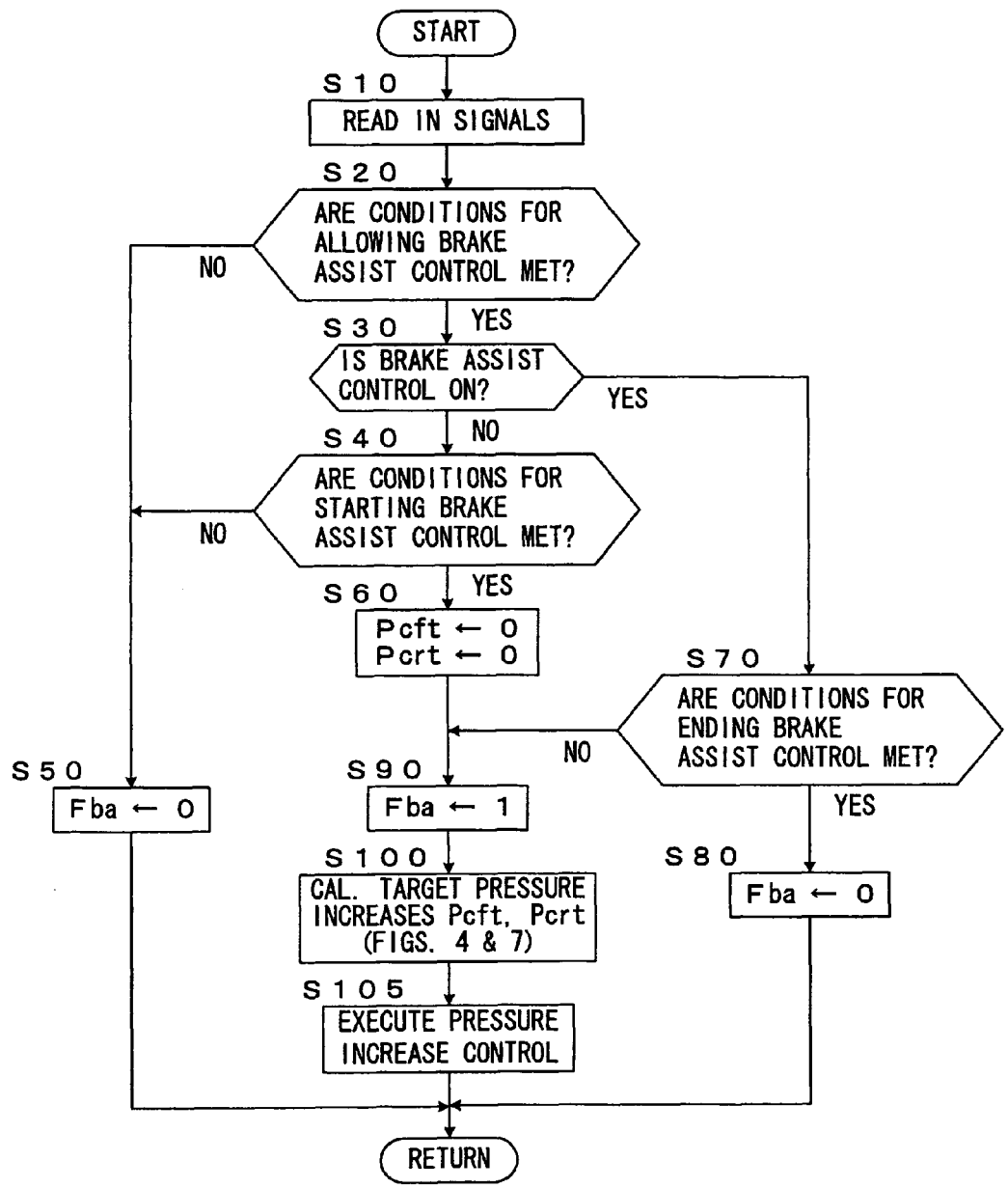
FIG. 3 is a flowchart showing the control operation by the braking force control system in the execution of the brake assist control in the brake system and the embodiment of the braking force control system according to the present invention shown in FIG. 1.

FIG. 3 is a flowchart showing an example of the control operation by an embodiment of the braking force control system according to the present invention during the executing the brake assist control in the brake system shown in FIG. 1. In the brake system of FIG. 1, the braking root pressures of the root passages 18F, 18R are adjusted by controlling the increase thereof from the master cylinder pressure by the pressure control valves 22F, 22R. Therefore, in the brake assist control described hereinbelow, the pressure increases for the braking root pressures of the root passages 18F, 18R for the front and rear wheels are controlled to become target values therefor.

The control according to FIG. 3 is started by the ignition switch not shown in the figure being closed, and repeated at a determined time interval until the ignition switch is opened. When the control cycle is started, the various signals described in reference to FIG. 1B are read in (step 10), and then it is judged if the conditions for allowing the brake assist control are met or not (step 20). The conditions for allowing the brake assist control may be determined, for example, according to the state of the stop lamp switch (not shown) adapted to be turned over manually or according to an optionally automatic manner. (When the driver does not want the brake assist control, the switch is turned off.)

When the conditions for allowing the brake assist control are met (for example, the stop lamp switch is turned on), and the break assist control is not executed (step 30), it is judged if the conditions for starting the brake assist control are met or not (step 40). The brake assist control is to be started when the driver has made a quick braking operation, and more concretely, it may be judged that the conditions for starting the brake assist control are met when all of the following conditions are met:

(1) Vehicle speed V is above a standard value Vbas (positive constant)
(2) Master cylinder pressure Pm is above a standard value Pmbas (positive constant)
(3) Increasing rate per time of the master cylinder pressure ΔPm is above a standard value ΔPmbas (positive constant)

In judging the amount of braking operation of the driver, the stroke, depressing force or any combination thereof of the brake pedal 12 may be used instead of the master cylinder pressure Pm. When the conditions for starting the brake assist control are met, the brake assist control is started as described hereinbelow.

In the first cycle after the start of the brake assist control, the target pressure increase Pcft and Pcrt for the front and rear wheels are reset to 0 (step 60), and then a flag Fba to show that the brake assist control is being executed is set to 1 (step 90).

After such an initial setting has been completed, the target pressure increases Pcft and Pcrt for the front and rear wheels are calculated (step 100), and then the pressure increases Pcf and Pcr for the front and rear wheels are controlled to become the target pressure increases Pcft and Pcrt (step 105). Is step 105 of the first cycle after the start of the brake assist control, the pressure control valves 22F, 22R are closed, while the valves 60F, 60R are opened as described above, and the pumps 42F, 42R are started to be driven. Then the electric currents supplied to the solenoids of the pressure control valves 22F, 22R are controlled to provide the target pressure increases Pcft, Pcrt determined in step 100.

Thus, after the start of the brake assist control, the control is repeated through steps 10, 20 and 30 of the flowchart of FIG. 3, executing the calculation of the target pressure increases Pcft and Pcrt (step 100) and increasing the pressures based upon the calculated targets thereof (105) until the conditions for ending the brake assist control are met (70). When the anti-skid control or the like is executed in step 100, the method of calculation for the target pressure increases Pcft and Pcrt is changed so that the increase of the target pressure increases Pcft and Pcrt is suppressed as described in detail hereinbelow.

When the conditions for ending the brake assist control are met (step 70) while the cycle of FIG. 3 is being repeated, the pressure control valves 22F, 22R are opened, while the valves 60F, 60R are closed, and the pumps 42F, 42R are stopped, so that the brake assist control is ended. It may be so determined that the conditions for ending the brake assist control are met when one of the following conditions is met:

(1) It was judged based upon the vehicle speed V that the vehicle has stopped.
(2) The master cylinder pressure Pm has lowered below a standard value Pmbae (positive constant) for ending the control.

When the brake assist control was thus ended, the flag Fba is reset to 0 (step 80), and then the braking pressure is controlled to follow the master cylinder pressure until the conditions for starting the brake assist control are again met (step 40).

Calculation of the Target Pressure Increases Pcft and Pcrt

First Embodiment

Figure 4:
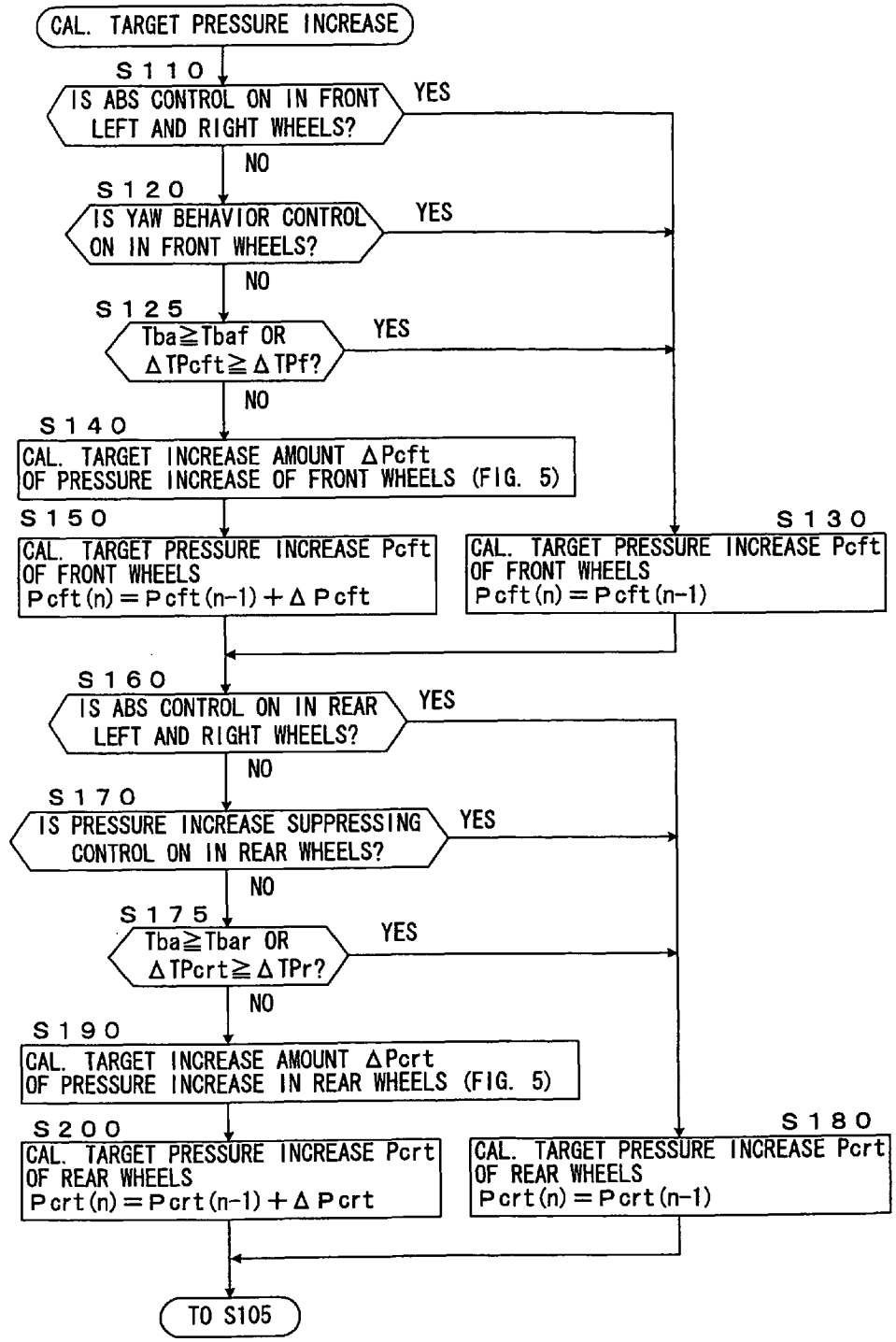
FIG. 4 is a flowchart showing a first embodiment of the process of calculating the target pressure increase in step 100 of FIG. 3.

FIG. 4 is a flowchart showing a first embodiment of the process for calculating the target pressure increases Pcft and Pcrt in step 100 of FIG. 3. In brief, the calculation process of FIG. 4 is constructed to prohibit the pressure increase of the braking root pressure of each of the front and rear wheels when the braking pressure increase suppressing control has been started for all of the wheel cylinders of each of the front and rear wheels or the probability thereof is high.

In the calculation process of FIG. 4, first it is judged if the braking pressure increase suppressing control has been started for all of the wheel cylinders belonging to the front root passage or the probability thereof is high. More concretely, it is judged (a) if the anti-skid control has been started for the front left and front right wheels (step 110), (b) if the anti-skid control has been started for one of the front left and front right wheels, while the braking pressure increase suppressing control by the yaw behavior control for suppressing the increase of the difference in braking force between the front left and front right wheels has been started for the other of the front left and front right wheels (step 120), or (c) the probability of (a) or (b) is high (step 125).

The judgment for the anti-skid control having been started or not in steps 110 and 120 may be made by using the information in the control routine for executing the anti-skid control executed separately from the control routine for the brake assist control of FIG. 3. The anti-skid control may be started with for each wheel when (1) the vehicle speed V is above a standard value Vas (positive constant) and (2) the braking slip ratio Si (i=fl, fr, rl, rr) is above a standard value Sas (positive constant). Then, the anti-skid control may be stopped when, for example, (1) the vehicle was judged to have stopped based upon the vehicle speed, or (2) the master cylinder pressure Pm has lowered below a standard value Pmae (positive constant) for ending the control therefor. It should be noted that the starting and ending of the anti-skid control may be done in the same manner for the front and rear wheels. (The standard values may be different.)

The judgment in step 120 for the yaw behavior control having been started or not may be made by using the information in the control routine executed separately from the control routine for the brake assist control of FIG. 3. The yaw behavior control may be started when, for example, (1) the vehicle speed V is above a standard value Vys (positive constant) and (2) the anti-skid control is being executed for one of the front left and front right wheels. The yaw behavior control may be stopped when, for example, (1) the vehicle was judged to have stopped based upon the vehicle speed V, (2) the anti-skid control executed for only one of the front left and front right wheels has ended, or (3) the anti-skid control was started for both of the front left and front right wheels.

In step 125, it may be judged if the consecutive time Tba from the start of the currently executed brake assist control is above a standard value Tbaf (positive constant), if the integrated value ΔTPcft of the increase amount ΔPcft of the target value of the pressure increase from the start of the currently executed brake assist control is above a standard value ΔTPf (positive constant), or the probability of (a) or (b) is high. As already described, the braking force of the wheel becomes higher as the total increasing amount of the braking root pressure by the braking force increasing control, i.e. TPcft, is larger, or the consecutive time Tba of increase of the braking root pressure by the braking force increasing control is longer. Therefore, the degree of probability of the anti-skid control or the yaw behavior control being started can be judged based upon the total increasing amount of the braking root pressure or the consecutive increasing time thereof. The standard value Tbaf and ΔTPf are set such that the consecutive time Tba and the integrated value ΔTPcft exceed the respective standard values when the probability of the braking force increase suppressing control being started is high. Step 125 may be carried out by the judgment of either one of the consecutive time and the integrated value.

When none of the abovementioned conditions (a), (b) and (c) is met in the front wheel system, that is, when the braking pressure increase suppressing control is started for none of the front wheels or has been started for only one of them, the braking root pressure increase by the brake assist control is executed with no suppression. In this case, the target increasing amount ΔPcft for the pressure increase of the front wheels is determined as a function of the consecutive time of the brake assist control as the line of ΔPcft of the map of FIG. 5 (step 140), and the target pressure increase Pcft(n) of the front wheels is calculated as Pcft(n)=Pcft(n−1)+ΔPcft (step 150). Herein Pcft(n−1) is the target pressure increase of the front wheels in the previous cycle. (This value is 0 in the first cycle after the start of the control. cf. step 60)

Figure 5A:
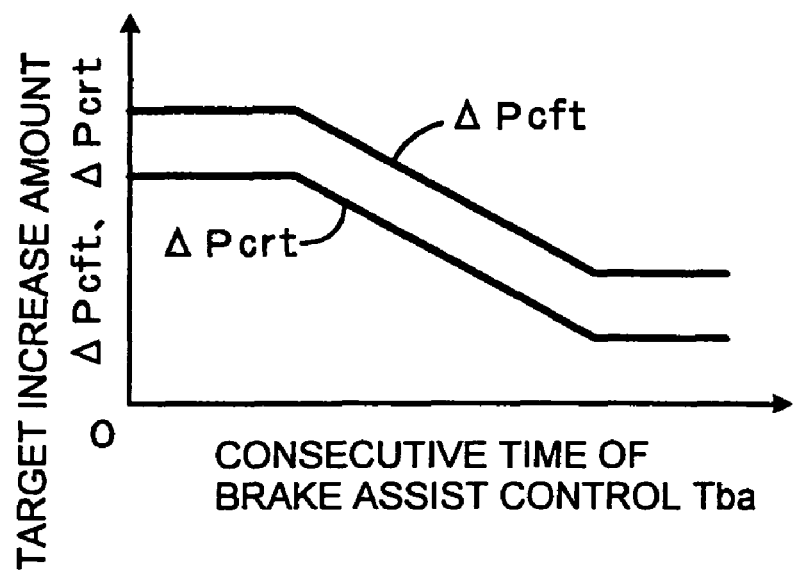
FIG. 5A is a map for determining the target increasing amounts $\Delta Pcft$ and $\Delta Pcrt$ for the front and rear wheels as a function of the consecutive execution time Tba of the brake assist control in step 140 or 190 of FIG. 4.

As will be understood from the map of the target increase amount ΔPcft shown in FIG. 5, the target increase amount ΔPcft is set to decrease along with the lapse of time of the brake assist control starting from the initiation of the brake assist control. Therefore, the gradient of increase of the target pressure increase Pcft(n) of the front wheels decreases along with the lapse of time. An example of the change the braking root pressure Pm+Pcf according to the lapse of time in that case is shown by a broken line in FIG. 6(A). (The braking root pressure is the sum of the master cylinder pressure and the pressure increase.) As already described, in the execution of the brake assist control, it is desirable that the braking force is increased as quickly as possible in an early stage, but after the braking force has increased, the braking root pressure is moderately increased so as to decrease the probability of the wheel to get into a locking.

Figure 6A:
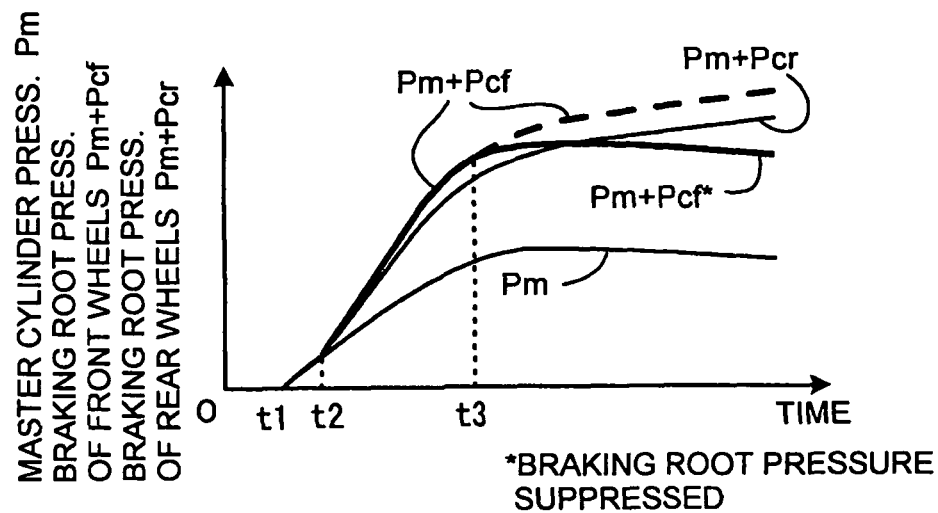
FIG. 6A is a graph showing examples of the changes of the master cylinder pressure Pm, the braking root pressure Pm+Pcf for the front wheels and the braking root pressure Pm+Pcr for the rear wheels when the anti-skid control is executed with respect to the front left and front right wheels.

In steps 110-125, when one of the above-mentioned conditions (a), (b) and (c) is met, starting at the moment the increase of the target pressure increase Pcft(n) for the front wheels is prohibited. Therefore, the increase of the braking root pressure is prohibited (step 130). In other words, the target pressure increase Pcft for the front wheels is given as Pcft(n)=Pcft(n−1). An example of the change of the braking root pressure Pm+Pcf* according to the lapse of time in such a case is shown in FIG. 6(A). (The increase of the target pressure increase Pcft for the front wheels is prohibited at time point t3.) Thereby when the braking pressure increase suppression is executed in all of the wheel cylinders connected to the front wheel circuit 10F in priority to the brake assist control, the electric power consumption for increasing the braking root pressure is saved. When the conditions have changed such that none of the conditions (a), (b) and (c) is met, the control returns to steps 140-150 so that the target pressure increase is calculated accordingly.

After the calculation of the target pressure increase of the front wheels, the target pressure increase of the rear wheels is calculated (steps 160-200). The judgment with regard to whether the braking pressure increase suppressing control has been started for all of the wheel cylinders of the rear wheels or the probability thereof is high is made, in concrete, by (d) if the anti-skid control has been started for both of the rear left and rear right wheels or not (step 160), (e) if the braking pressure increase suppressing control for the rear wheels has been started according to the braking force front/rear distribution control or not (step 170), and (f) if the probability of the controls of (e) and (d) being started is high or not (step 175). In such a judgment, the judgment for the anti-skid control may be done in the manner as in the case of the front wheels.

The judgment with regard to if the braking pressure increase suppressing control of the rear wheels according to the braking force front/rear distribution control has been started or not may be done by using the information in the control routine executed separately from the control routine for the brake assist control of FIG. 3. The braking force front/rear distribution control is executed to avoid the rear wheels to get into a locking before the front wheels when the amount of braking operation becomes large, and, in concrete, it may be started when all of the following conditions are met:

(1) Vehicle speed V estimated in a manner known in this art based upon the wheel speeds Vwi of the respective wheels is above a standard value Vrs (positive constant).

(2) The braking slip ratios Srl and Srr of the rear left and rear right wheels calculated in a manner known in this art based upon the wheel speeds Vwi are above a standard value Srs (positive constant).

Further, the braking force front/rear distribution control may be ended when, for example, (1) vehicle was judged to have stopped based upon the vehicle speed V, or (2) the master cylinder pressure Pm has lowered below a standard value Pmre (positive constant).

The probability of start of the control of (d) or (e) being high or not (step 175) may be judged, in the same manner as in step 125 for the front wheels, when the consecutive time Tba from the start of the currently executed brake assist control is above a standard value Tbar (positive constant) or when the integrated value ΔTPcrt of the increase amount ΔPcrt of the target pressure increase from the start of the currently executed brake assist control is above a standard value ΔTPr (positive constant). The standard value Tbar or ΔTPr is determined such that it is exceeded by the consecutive time Tba or the integrated value ΔTPcrt when the probability of start of the braking pressure increase suppressing control is high.

In the same manner as in the front wheels, also in the rear wheel system the braking root pressure is increased by the brake assist control with no suppression when none of the abovementioned conditions (d), (e) and (f) is met. Like the line of ΔPcrt in the map of FIG. 5, the target pressure increase ΔPcrt of the rear wheels is determined to decrease along with the lapse of consecutive time of the brake assist control (step 190), and the target pressure increase of the rear wheels Pcrt(n) is calculated as Pcrt(n)=Pcrt(n−1)+ΔPcrt (step 200). Herein Pcrt(n−1) is the target pressure increase of the rear wheels in the previous cycle. An example of such a change of the braking root pressure Pm+Pcr according to the lapse of time is shown in FIG. 6(B). The target increase amount of pressure increase ΔPcrt of the rear wheel pressure increase, i.e. the increasing gradient in the increase, is smaller than that in the front wheels, because the rear wheels are more liable to get into a locking at a lower braking pressure than the front wheels.

On the other hand, when any of the conditions of (d), (e) and (f) is met in steps 160-175, the increase of the target pressure increase Pcrt(n) of the rear wheels is prohibited from the moment (step 180), in the same manner as in the front wheels. In other words, the target pressure increase Pcrt(n) is determined as Pcrt(n)=Pcrt(n−1). An example of such a change of the braking root pressure Pm+Pcr* according to the lapse of time is shown in FIG. 6(B). (The increase of the target pressure increase Pcrt of the rear wheels is prohibited at time point t4.) Thus, when the suppression of the increase of the braking pressure is executed for all of the wheel cylinders connected to the circuit 10R of the rear wheels, the electric power consumption for increasing the braking root pressure is saved. When it has become such that none of the conditions of (d), (e) and (f) is met, the target pressure increase is calculated according to steps 190-200, as in the front wheels.

Thus, when the target pressure increases Pcft, Pcrt are determined by the calculating process shown in FIG. 4, when the braking force increase suppressing control is executed for all of the wheel cylinders during the brake assist control, the increase of the braking root pressure is prohibited. When the anti-skid control is executed for only one of the wheel cylinders in each circuit, the suppression of the increase of the braking root pressure is not prohibited, but when the yaw behavior deteriorates thereby, the behavior control is executed, and it can happen that the braking pressure increase suppressing control is executed for all of the wheel cylinders of each circuit. In such a case, the prohibition of the increase of the braking root pressure is executed. When the braking pressure of the rear wheels only has increased as a result of the execution of the braking force increase suppressing control for only all of the front wheels, the braking force front/rear distribution control is executed, and thereby it can happen that the increase of the braking root pressure of the rear wheels is suppressed.

Figure 5B:
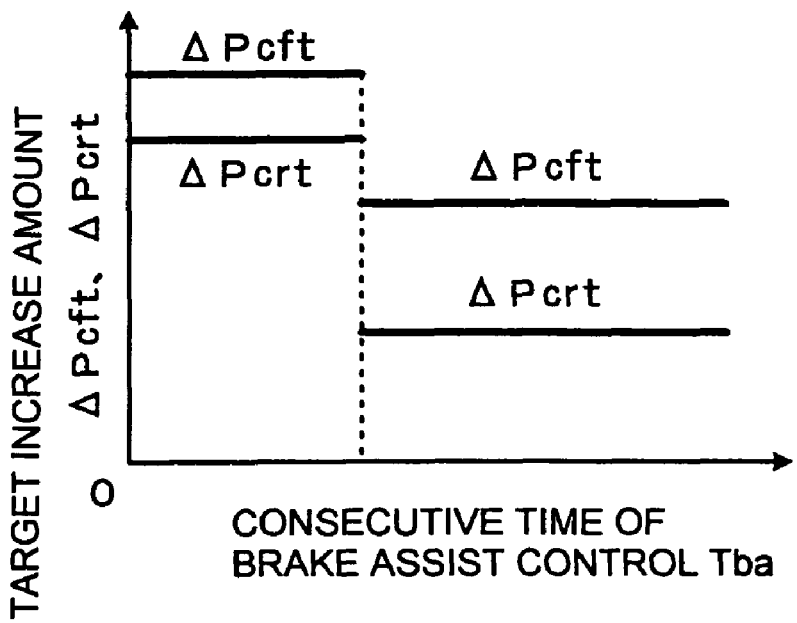
FIG. 5B is a modification of the map of FIG. 5A.
Figure 6B:
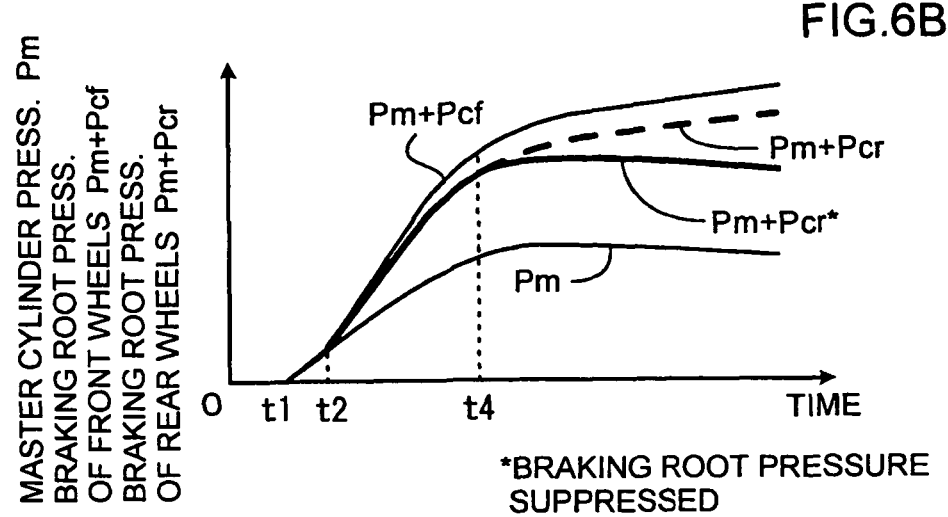
FIG. 6B is a graph showing examples of the changes of the master cylinder pressure Pm, the braking root pressure Pm+Pcf for the front wheels and the braking root pressure Pm+Pcr for the rear wheels when the anti-skid control is executed with respect to the rear left and rear right wheels. The target increasing amounts are determined by the flowchart of FIG. 4. The changes when the anti-skid control is not executed are shown by the broken lines.

In the calculation processes described above, the target increase amounts ΔPcrt and ΔPcft for the pressure increase may be decreased as exemplarily shown in FIG. 5B after the brake assist control has been executed for a determined consecutive time. Further, in the flowchart of FIG. 4, steps 125 and 175 may be omitted so that the increase of the braking-root pressure is prohibited when the braking pressure increase suppressing control is started for all of the wheel cylinders in each circuit.

Second Embodiment

Figure 7:
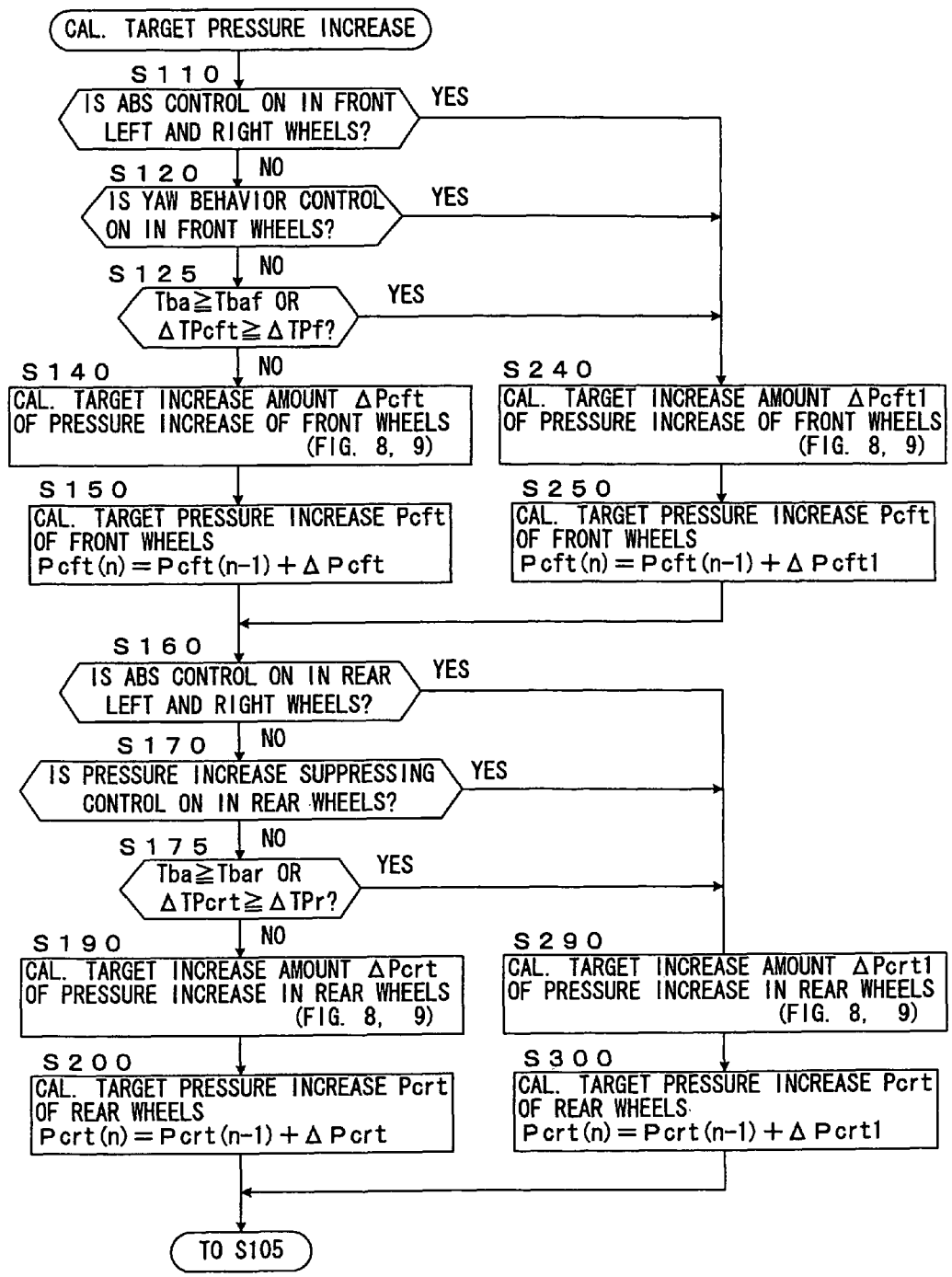
FIG. 7 is a flowchart showing a second embodiment of the calculating operation for the target pressure increase in step 100 of FIG. 3.

FIG. 7 is a flowchart showing the flow of control in the second embodiment of the calculation process of the target pressure increases Pcft, Pcrt in step 100 of the flowchart of FIG. 3. In brief, the calculation process of FIG. 7 is constructed such that when it is judged that the braking force increase suppressing control was started for all of the wheel cylinders connected to each of the circuits for the front and rear wheels or the probability thereof is high, the increasing gradient of the braking root pressure increase is decreased as compared with when it is not judged that braking force increase suppressing control was started or the probability thereof is high. This control is different from that shown in FIG. 4 in that, when it was judged that the braking pressure increase suppressing control was started for all of the wheel cylinders connected to each of the circuits for the front and rear wheels or the probability thereof is high, i.e. when any of the conditions of (a)-(f) is met in steps 110-125 or 160-175, steps 240-250 or 290-300 are executed instead of steps 130 or 180.

Figure 8A:
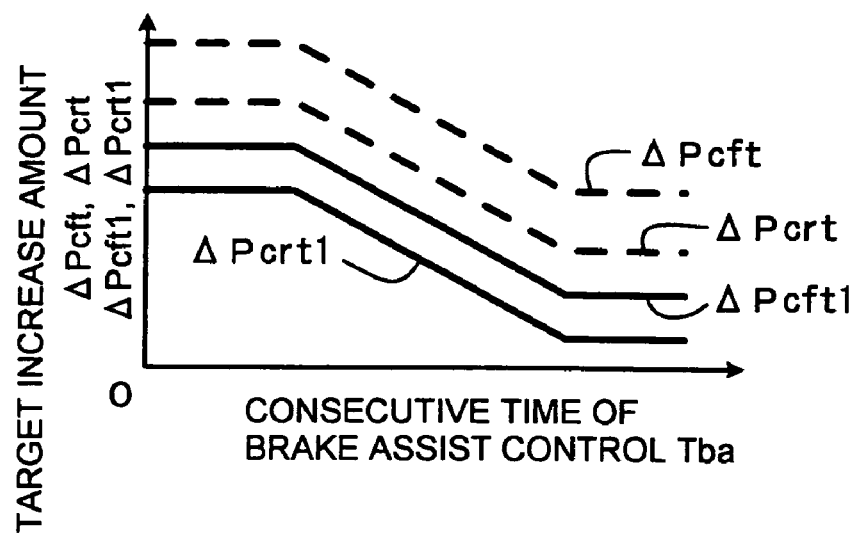
FIG. 8A is a map for determining the target increasing amount ΔPcft for the pressure increase of the front wheels and the target increasing amount ΔPcrt for the pressure increase of the rear wheels as a function of the consecutive time Tba of the pressure assist control in step 140 or 190 of FIG. 7 and the target increasing amount ΔPcft1 for the pressure increase of the front wheels and the target increasing amount ΔPcrt1 for the pressure increase of the rear wheels as a function of the consecutive time Tba of the pressure assist control in step 240 or 290 of FIG. 7.

When any of the conditions of (a)-(c) is met in step 110-125, or when any of the conditions of (d)-(f) is met in steps 160-175, the target increase amount $\Delta Pcft1$ or $\Delta Pcrt1$ for the pressure increase of the front or rear wheels are determined as a function of the consecutive time of the brake assist control as shown by $\Delta Pcft1$ or $\Delta Pcrt1$ of the map of FIG. 8A (step 240 or 290), and the target pressure increase $Pcft(n)$ and $Pcrt(n)$ of the front and rear wheels are calculated as follows:

$$Pcft(n)=Pcft(n-1)+\Delta Pcft1$$

or $$Pcrt(n)=Pcrt(n-1)+\Delta Pcrt1$$

Figure 8B:
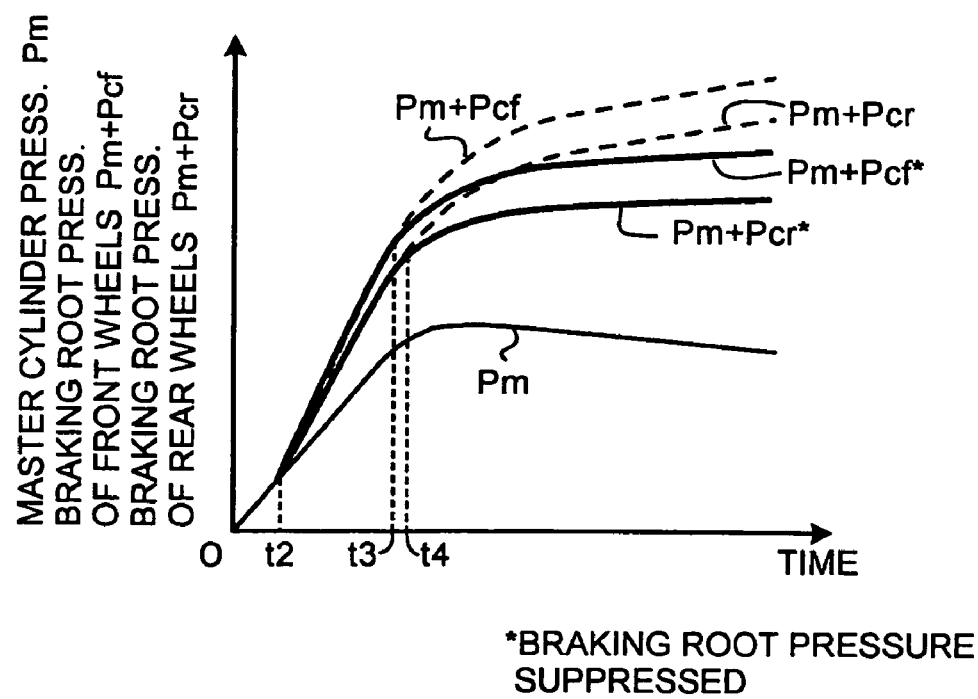
FIG. 8B shows an example of the changes of the master cylinder pressure Pm, the braking root pressure Pm+Pcf for the front wheels, and the braking root pressure Pm+Pcr for the rear wheels when the target increasing amounts are determined according to the flowchart of FIG. 7 by referring to the maps of FIG. 8A. The solid lines show the case that the increase of the braking root pressure is suppressed with respect to the front left and front right wheels, while the broken lines show the case that the increase of the braking root pressure is not suppressed.

It is to be noted here that the target pressure increase $\Delta Pcft1$ or $\Delta Pcrt1$ obtained in step 240 or 290 is smaller than the target pressure increase $\Delta Pcft$ or $\Delta Pcrt$ obtained in step 140 or 190. Therefore, as shown in FIG. 8B, the increasing gradient of the braking root pressure in the case that the braking pressure increase suppressing control is executed for all of the wheel cylinders of one circuit or the probability thereof is high is smaller than that of the braking root pressure increased according to the brake assist control. Therefore, when the braking pressure increase suppressing control is started for all of the wheel cylinders connected to one circuit, the electric power consumption for increasing the braking root pressure is saved as in the calculation process of FIG. 4.

Further, according to the calculation process of FIG. 7, the increase of the braking root pressure continues during the execution of the braking force increase suppressing control, although the increasing gradient is decreased, so as to be higher than the braking pressure in the wheel cylinder for which the braking force increase suppressing control is executed. When the braking root pressure is made lower than that based upon the demand by the brake assist control but higher than the braking pressure maintained, not only the electric power consumption is decreased as described in the section of the disclosure of the invention but also the following merits are obtained:

First, by the braking root pressure of the root passages 18F, 18R connected with the wheel cylinders 26i at which the braking pressure increase suppressing control is executed being suppressed, the pressure difference of the braking root pressure between the upstream and the downstream of the electromagnetic valves 28i becomes smaller than when the braking root pressure increase suppressing control is not executed, so that thereby the duty ratio control for the opening and closing of the electromagnetic valves 28i becomes easier. In other words, the probability of the braking pressure of the wheel cylinders 26i becoming excessively high by the valves 28i (when the opening duration thereof is too long) or excessively low by the valves 28i (when the opening duration thereof is too short) is lowered, so that the control of the braking pressure becomes more accurate.

Secondly, by the fact that the braking root pressure is higher than the braking pressure in the wheel cylinders at which the braking force increase suppressing control is executed, the increase of the braking pressure toward the value by the brake assist control after the dissolving of the braking force increase suppressing control is made quicker than when the braking root pressure increase is prohibited. In the actual control, it can happen that the braking force increase suppressing control once started is dissolved by the road surface condition or the like. In that case, if the braking root pressure in the upstream of the electromagnetic valves 28i of the wheel cylinders 26i at which the braking force increase suppressing control is executed is higher than the braking pressure of the wheels cylinders 26i at which the braking root pressure was maintained, the braking pressure of the wheel cylinders 26i can be quickly increased so as to be able to generate a strong braking force.

Thus, according to the calculation process shown in FIG. 7, the electric power consumption for increasing the braking root pressure is decreased, while the precision of the braking pressure control of the wheel cylinders 26i during the braking force increase suppressing control and the responsiveness for increasing the braking pressure after the dissolving of the braking force increase suppressing control (controllability of the braking pressure) is improved. In the flowchart of FIG. 7, the target pressure increases $\Delta Pcrt$, $\Delta Pcft$ or $\Delta Pcrt1$, $\Delta Pcft1$ may be decreased after the lapse of a determined consecutive time of brake assist control as shown in FIG. 5B in the same manner as in the case of FIG. 4. Further, steps 125 and 175 may be omitted.

Third Embodiment

Figure 9:
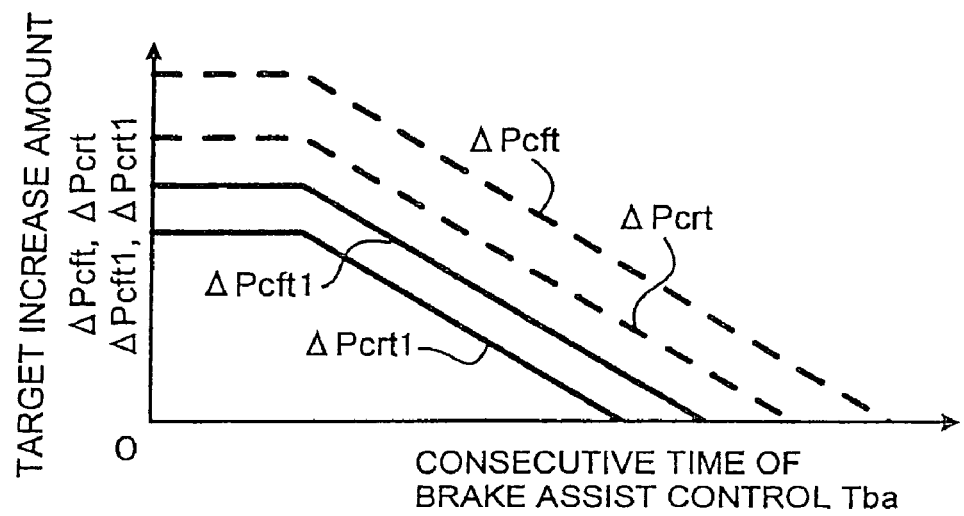
FIG. 9 is a map for determining the target increasing amount ΔPcft for the pressure increase of the front wheels and the target increasing amount ΔPcrt for the pressure increase of the rear wheels as the function of the consecutive time Tba of the brake assist control in step 140 or 190 of FIG. 7 and the target increasing amount ΔPcft1 for the pressure increase of the front wheels and the target increasing amount ΔPcrt1 for the pressure increase of the rear wheels as the function of the consecutive time Tba of the brake assist control in step the and 240 or 290 of FIG. 7, in the third embodiment of the calculating operation for the target pressure increase in step 100 of FIG. 3.

With regard to the calculation process of the target pressure increase $Pcft$, $Pcrt$ in step 100 of the flowchart of FIG. 3, a third embodiment may be executed in the same manner as the second embodiment shown in the flowchart of FIG. 7. The difference from the second embodiment is in that in the determination of the target increase amount $\Delta Pcft$, $\Delta Pcrt$ or $\Delta Pcft1$, $\Delta Pcrt1$ in steps 240 and 290 of FIG. 7, the target increase amounts are each converged to zero as shown in FIG. 9. In other words, the final target amounts become the amounts integrating $\Delta Pcft$, $\Delta Pcrt$ or $\Delta Pcft1$, $\Delta Pcrt1$ of the graph of FIG. 9. Therefore, the pressure increase of the braking root pressure during the brake assist control increases toward the final target amount which is the integration of the map of FIG. 9.

Referring to FIG. 9, with respect to the target increase amount of the front wheels, for example, $\Delta Pcft1$ given in step 240 is set to be an amount which is smaller than $\Delta Pcft$ given in step 140. This is the same with respect to the target increase amount of the rear wheels. Therefore, according to this embodiment, when it was judged that the initiation or the probability thereof of the braking force increase suppressing control for all of the wheel cylinders connected to one system is high in each of the circuits for the front and rear wheels (i.e. when either of the conditions (a)-(f) was fulfilled), the final target pressure of the braking root pressure of the common line is decreased than when the initiation or the probability thereof of the braking force increase suppressing control is not judged.

Figure 10A:
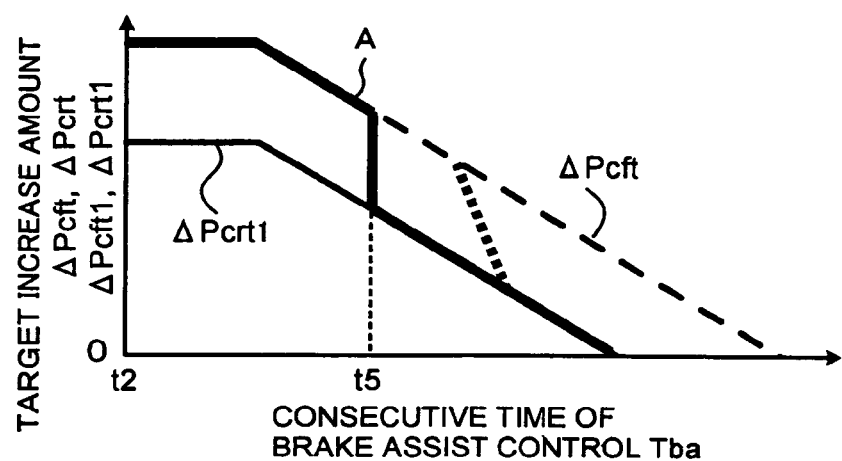
FIG. 10A is a map similar to FIG. 9, showing the change of the target increasing amount ΔPcft1 of pressure increase of the front wheels when the increase of the braking root pressure is suppressed by the anti-skid control executed during the brake assist control.
Figure 10B:
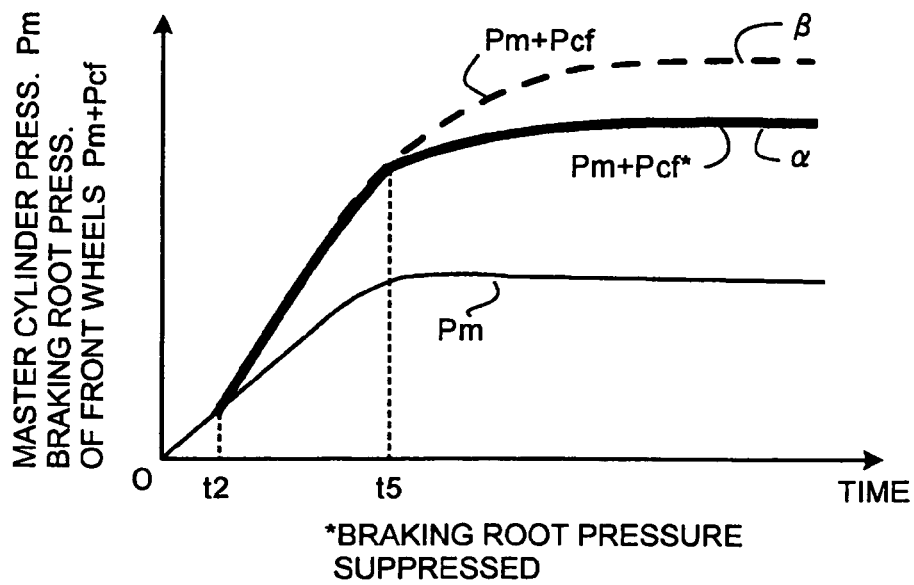
FIG. 10B shows the changes of the braking root pressure Pm+Pcft of the front wheels when the target increasing amount ΔPcft1 is changed as shown in FIG. 10A. The broken line shows the changes of the braking root pressure when the increase of the braking root pressure is not suppressed.

Referring to FIG. 10A, when, for example, the above-mentioned condition (a) was fulfilled by the execution of the anti-skid control or the like at time point t5 after the start of the brake assist control, the change of the target increase amount becomes like the change shown by line A. Therefore, in contrast to that the amount of integration of $\Delta Pcft$ on time basis is the final target amount of the pressure increase when the anti-skid control or the like was not executed, the final target amount of the pressure increase is changed to the amount which is the integration of the line A on time basis by the anti-skid control or the like being executed. Therefore, the braking root pressure in the case that the anti-skid control or the like is executed is suppressed in its increase as shown by line α in FIG. 10B as compared with that shown by line β in FIG. 10B for the braking root pressure in the case that the anti-skid control or the like is not executed. When it has come during the brake assist control to such that the condition (a) is not fulfilled by the anti-skid control or the like being ended, the target increase amount may again be increased. In that case, the target increase amount may desirably be increase such that the final target pressure becomes the same amount as in the case that the braking root pressure increase suppressing control was not executed, as shown by a broken line in FIG. 10A.

According to this third embodiment, the electric power consumption for increasing the braking root pressure is decreased when the anti-skid control or the like is executed during the brake assist control in the same manner as the first and second embodiments, and the controllability of the brake pressure is improved in the same manner as the second embodiment. The map for the target increase amount shown as a graph in FIG. 9 may be optionally changed when the final target amount of the pressure increase under the execution of the anti-skid control becomes smaller than that under no execution of the anti-skid control. Therefore, it is to be understood that such a modification is within the scope of the present invention.

Although the present invention has been described in detail with respect to some particular embodiments thereof, it will be apparent for those killed in the art that various modifications are possible within the scope of the present invention.

For example, although the brake system of the above mentioned respective embodiments is such that the braking pressures of the respective lines each provided for the front and rear wheels are controlled by pressure control valves 22F, 22R, the present invention is applicable to any brake system known in this art in which the braking pressure for the front and rear wheels can be controlled to be higher than the master cylinder pressure.

The invention claimed is:

1. A braking force control system for vehicles adapted to execute a braking force increasing control when a driver makes a quick braking operation, and to execute a braking force increase suppressing control for suppressing the increase of the braking force with respect to a selected wheel or wheels when the vehicle is in a determined running condition, comprising:

control valves provided for respective wheels to adjust braking pressures of the respective wheels, a pump for pressurizing a brake oil, a braking root pressure control valve to increase or decrease a braking root pressure supplied to the respective control valves for a pair of left and right ones of the respective wheels by selectively releasing the brake oil pressurized by the pump, a judging device to judge an initiation or a high probability thereof of the braking force increase suppressing control with respect to both of the pair of left and right ones of the respective wheels, and a braking pressure control device to operate the control valves provided for the respective wheels so as to adjust the braking pressures of the respective wheels, the braking pressure control device suppressing the increase of the braking root pressure by also operating the braking root pressure control valve when the initiation or the high probability thereof of the braking force increase suppressing control is judged by the judging device during the braking force increasing control with respect to the pair of left and right ones of the respective wheels as compared to when the initiation or the high probability thereof of the braking force increase suppressing control is not judged, wherein the braking pressure control device decreases an increasing gradient of the braking root pressure to suppress the increase of the braking root pressure, and when an initiation or a high probability thereof of an anti-skid control with respect to one of the front left and front right wheels is judged and an initiation or a high probability thereof of a yaw behavior control with respect to the other of the front left and front right wheels for suppressing an increase of a difference between the braking forces of the front left and front right wheels is also judged, the braking pressure control device decreases the increase gradient of the braking root pressure of both of the front left and front right wheels.

2. A braking force control system for vehicles adapted to execute a braking force increasing control when a driver makes a quick braking operation, and to execute a braking force increase suppressing control for suppressing the increase of the braking force with respect to a selected wheel or wheels when the vehicle is in a determined running condition, comprising:

control valves provided for respective wheels to adjust braking pressures of the respective wheels, a pump for pressurizing a brake oil, a braking root pressure control valve to increase or decrease a braking root pressure supplied to the respective control valves for a pair of left and right ones of the respective wheels by selectively releasing the brake oil pressurized by the pump, a judging device to judge an initiation or a high probability thereof of the braking force increase suppressing control with respect to both of the pair of left and right ones of the respective wheels, and a braking pressure control device to operate the control valves provided for the respective wheels so as to adjust the braking pressures of the respective wheels, the braking pressure control device suppressing the increase of the braking root pressure by also operating the braking root pressure control valve when the initiation or the high probability thereof of the braking force increase suppressing control is judged by the judging device during the braking force increasing control with respect to the pair of left and right ones of the respective wheels as compared to when the initiation or the high probability thereof of the braking force increase suppressing control is not judged, wherein when the braking force increasing control is executed, the braking pressure control device increases the braking root pressure up to a determined final target pressure, while the braking pressure control device decreases a final target pressure of the braking root pressure when the initiation or the high probability thereof of the braking force increase suppressing control is judged, and when an initiation or a high probability thereof of an anti-skid control with respect to one of the pair of front left and front right wheels is judged and an initiation or a high probability thereof of a yaw behavior control with respect to the other of the pair of front left and front right wheels for suppressing an increase of a difference of the braking forces of the pair of front left and front right wheels is judged, the braking pressure control device decreases the final target pressure of the braking root pressure of the pair of front left and right wheels.

3. A braking force control system for vehicles adapted to execute a braking force increasing control when a driver makes a quick braking operation, and to execute a braking force increase suppressing control for suppressing the increase of the braking force with respect to a selected wheel or wheels when the vehicle is in a determined running condition, comprising:

control valves provided for respective wheels to adjust braking pressures of the respective wheels, a pump for pressurizing a brake oil, a braking root pressure control valve to increase or decrease a braking root pressure supplied to the respective control valves for a pair of left and right ones of the respective wheels by selectively releasing the brake oil pressurized by the pump, a judging device to judge an initiation or a high probability thereof of the braking force increase suppressing control with respect to both of the pair of left and right ones of the respective wheels, and a braking pressure control device to operate the control valves provided for the respective wheels so as to adjust the braking pressures of the respective wheels, the braking pressure control device suppressing the increase of the braking root pressure by also operating the braking root pressure control valve when the initiation or the high probability thereof of the braking force increase suppressing control is judged by the judging device during the braking force increasing control with resect to the pair of left and right ones of the respective wheels as compared to when the initiation or the high probability thereof of the braking force increase suppressing control is not judged, wherein the judging device judges that the probability of initiation of the braking force increase suppressing control is high when the total increasing amount of the braking root pressure by the braking force increasing control exceeds a standard value.

4. A braking force control system for vehicles adapted to execute a braking force increasing control when a driver makes a quick braking operation, and to execute a braking force increase suppressing control for suppressing the increase of the braking force with respect to a selected wheel or wheels when the vehicle is in a determined running condition, comprising:

control valves provided for respective wheels to adjust braking pressures of the respective wheels, a pump for pressurizing a brake oil, a braking root pressure control valve to increase or decrease a braking root pressure supplied to the respective control valves for a pair of left and right ones of the respective wheels by selectively releasing the brake oil pressurized by the pump, a judging device to judge an initiation or a high probability thereof of the braking force increase suppressing control with respect to both of the pair of left and right ones of the respective wheels, and a braking pressure control, device to operate the control valves provided for the respective wheels so as to adjust the braking pressures of the respective wheels, the braking pressure control device suppressing the increase of the braking root pressure by also operating the braking root pressure control valve when the initiation or the high probability thereof of the braking force increase suppressing control is judged by the judging device during the braking force increasing control with respect to the pair of left and right ones of the respective wheels as compared to when the initiation or the high probability thereof of the braking force increase suppressing control is not judged, wherein the judging device judges that the probability of initiation of the braking force increase suppressing control is high when the consecutive time of increase of the braking root pressure by the braking force increasing control exceeds a standard time.

\* \* \* \* \*